United States Patent
Denton et al.

(10) Patent No.: US 7,349,751 B2
(45) Date of Patent: *Mar. 25, 2008

(54) METHOD FOR AUTONOMIC CONTROL OF A MANUFACTURING SYSTEM

(75) Inventors: Brian T. Denton, Winooski, VT (US); Kenneth J. Fordyce, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/538,821

(22) Filed: Oct. 5, 2006

(65) Prior Publication Data

US 2007/0088449 A1 Apr. 19, 2007

Related U.S. Application Data

(63) Continuation of application No. 10/905,456, filed on Jan. 5, 2005, now Pat. No. 7,151,972.

(51) Int. Cl.
G06F 19/00 (2006.01)
(52) U.S. Cl. .......................................... 700/99; 700/100
(58) Field of Classification Search .................. 700/99, 700/100, 101–104
See application file for complete search history.

(56) References Cited

U.S. PATENT DOCUMENTS

| | | | |
|---|---|---|---|
| 4,027,246 A | 5/1977 | Caccoma et al. | |
| 4,669,047 A | 5/1987 | Chucta | |
| 5,612,886 A | 3/1997 | Weng | |
| 5,721,686 A * | 2/1998 | Shahraray et al. | 700/102 |
| 5,880,960 A | 3/1999 | Lin et al. | |
| 6,157,866 A | 12/2000 | Conboy et al. | |
| 6,248,602 B1 | 6/2001 | Bode et al. | |
| 6,256,550 B1 | 7/2001 | Wu et al. | |
| 6,529,789 B1 | 3/2003 | Campbell et al. | |
| 6,556,959 B1 | 4/2003 | Miller et al. | |
| 6,714,830 B2 | 3/2004 | Browning | |
| 7,043,318 B1 * | 5/2006 | Barto et al. | 700/100 |
| 7,072,732 B2 * | 7/2006 | Muramatsu et al. | 700/103 |
| 7,174,232 B2 * | 2/2007 | Chua et al. | 700/102 |
| 2002/0165804 A1 | 11/2002 | Beebe et al. | |
| 2003/0109945 A1 | 6/2003 | Cho et al. | |
| 2003/0225474 A1 | 12/2003 | Mata et al. | |

* cited by examiner

*Primary Examiner*—Zoila Cabrera
(74) *Attorney, Agent, or Firm*—Gibb & Rahman, LLC; Richard M. Kotulak, Esq.

(57) ABSTRACT

Disclosed is a method of controlling a manufacturing system. The invention automatically monitors current levels of partially completed products waiting to be processed by a tool (or group of tools) and determines whether the current levels exceed a predetermined limit. If the current levels do exceed the predetermined limit, the invention performs an optimization process. However, if the current levels do not exceed the predetermined limit, the invention performs a dispatching process. In this dispatching process, the invention automatically projects future levels of partially completed products that will be supplied to the tool to identify a future work-in-process (WIP) bubble. The WIP bubble occurs when larger than normal amounts of partially completed products are supplied to the tool. The invention automatically adjusts the operating parameters of the tool based upon both the current levels and the future levels.

9 Claims, 3 Drawing Sheets

METHOD FOR AUTONOMIC CONTROL OF A MANUFACTURING SYSTEM

CROSS-REFERENCE TO RELATED APPLICATIONS

This application is a continuation of U.S. application Ser. No. 10/905,456 filed Jan. 5, 2005 now U.S. Pat. No. 7,151,972, which is fully incorporated herein by reference.

BACKGROUND OF THE INVENTION

1. Field of the Invention

The present invention relates to computer implementable decision support systems for determining factory schedules and dispatching systems for determining job priorities. General methodologies within this field of study include advanced planning systems, optimization and heuristic based algorithms, constraint based programming, simulation, and autonomic control.

2. Description of the Related Art

The dispatching of production lots is a critical activity for smooth and reliable operation of a manufacturing system. Shop floor software scheduling systems are used to decide the sequence of a set of queued lots to dispatch to a given tool in the manufacturing line. For simple manufacturing systems, a first-in-first-out (FIFO) rule is often a reasonable choice. However, in semiconductor manufacturing, there are various tool-specific and lot specific scheduling attributes which make this a poor or infeasible choice. The invention relates to a new scheduling problem common to 300 mm semiconductor manufacturers, an associated mathematical model, and a method for deciding whether to determine a production schedule via optimization or real time dispatching. The method can also be generalized to other manufacturing environments and conditions.

Semiconductor manufacturing, and other manufacturing industries, rely on a variety of tool sets. Many tools (e.g., photolithography tools) process production lots one at a time. However, some operations (e.g., furnace) are batch operations which can process multiple production lots at a time. For example, a typical furnace may process up to 6 production lots at a time. However, it is not strictly a requirement that 6 lots be processed in each batch. This leaves open the opportunity to create smaller batches which can be released earlier, rather than waiting for a full batch of the lots to arrive. Releasing smaller batches, rather than waiting for a complete batch, can improve tool efficiency and processing time for lots. For instance, consider the following simple example. A furnace tool currently has a single lot in queue and no lots are projected to arrive for 6 hours. If the batch processing time is less than 6 hours, and there are no substantial variable costs per batch, then it is sensible to release a batch with a single lot to reduce its flow time, rather than have the lot wait in front of the idle furnace for 6 hours to construct a full batch.

There has been substantial study of scheduling in manufacturing operations in the operations research and industrial engineering literature (e.g., Baker—"Elements of Sequencing and Scheduling" 1994 describes several of the classical problems referenced in the scheduling literature).

Autonomic systems are systems that have the ability to automatically manage themselves and dynamically adapt to change, subject to a set of overall system objectives. These self-managing systems are able to react to changes that they sense in their environment without the need for human intervention. Autonomic principles have been applied to computing in both hardware and software areas.

SUMMARY OF THE INVENTION

A method of, and service for, controlling a manufacturing system is disclosed herein. The invention automatically monitors current levels of partially completed products waiting to be processed by a tool (or group of tools) and determines whether the current levels exceed a predetermined limit. If the current levels do exceed the predetermined limit, the invention performs an optimization process for determining a schedule for processing WIP lots at a tool. However, if the current levels do not exceed the predetermined limit, the invention performs a dispatching process for determining which available WIP lots to process at a tool. In this dispatching process, the invention automatically projects future levels of partially completed products that will be supplied to the tool to identify a future work-in-process (WIP) bubble. The WIP bubble occurs when larger than normal amounts of partially completed products are supplied to the tool. The invention automatically adjusts the mode of the dispatching system based upon both the current levels and the future levels.

The process of projecting the future levels of partially completed products that will be available for dispatch to the tool is based on measurements of tool usage in the manufacturing system, product routing information, partially completed products availability, processing cycle time information, operational failures in the manufacturing system and optionally an Automated Materials Handling System (AMHS) that will effect the partially completed products before the partially completed products are scheduled to be supplied to the tool. If a future WIP bubble is identified, the operating parameters of the dispatching system are adjusted to provide additional throughput for the larger than normal amounts of partially completed products. The invention can also adjust the way in which it processes by comparing the projected future levels of partially completed product with corresponding actual supplied levels of partially completed products, and adjusting the process based upon the results of such a comparison.

These, and other, aspects and objects of the present invention will be better appreciated and understood when considered in conjunction with the following description and the accompanying drawings. It should be understood, however, that the following description, while indicating embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF EMBODIMENTS OF THE INVENTION

Figure 1:
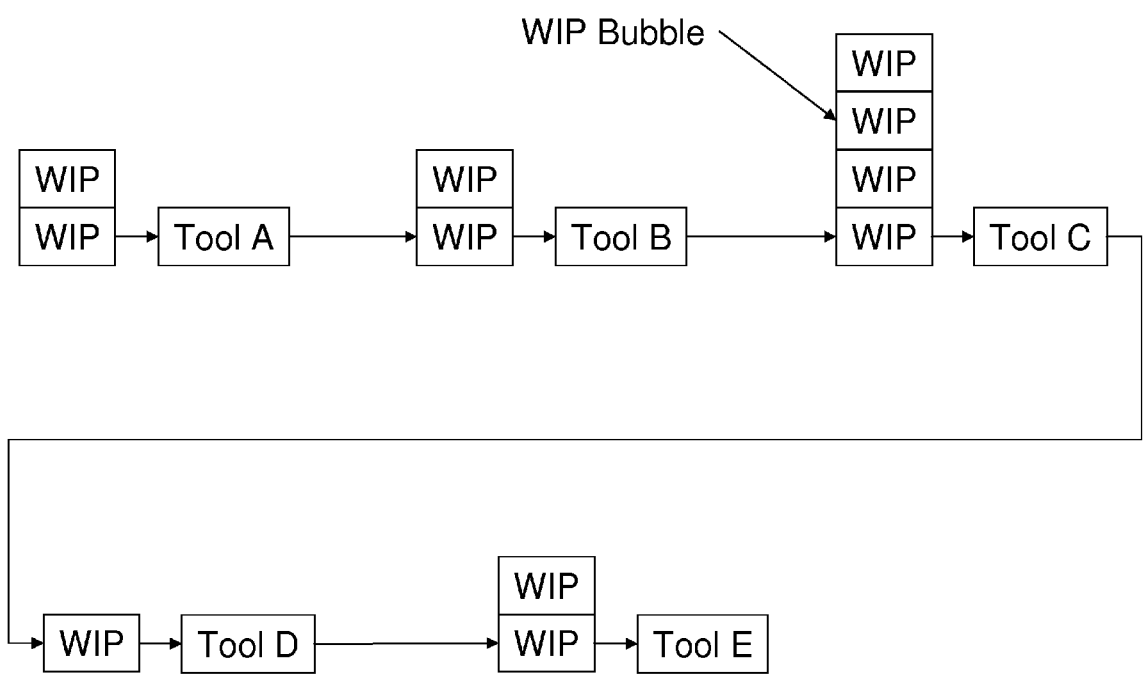
FIG. 1 is a diagram illustrating a WIP bubble.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced, and to further enable those of skill in the art to practice the invention. Accordingly, the examples should not be construed as limiting the scope of the invention.

All manufacturing lines have instances of unbalance in which work in process inventory (WIP) is not uniformly distributed across the system, but rather is accumulated in front of one or more particular manufacturing operations. This condition is referred to as a "WIP bubble". For example, a WIP bubble is illustrated in front of tool C in FIG. 1. The WIP bubble may have been caused by some problem with tool C, or some other problem. While the WIP bubble has not yet reached tools D and E, with the invention, tools D and E will change their operating parameters before the WIP bubble reaches them, so that they can handle the WIP bubble in the most efficient manner. WIP bubbles affect not only the current state of the system but also the other manufacturing operations downstream, since the manufacturing lots forming the bubble should be processed through additional operations during the remainder of the manufacturing process. Managing WIP bubbles requires a modification to scheduling system objectives to shift from traditional criteria such as priority, critical ratio, and tool dedication to criteria based on tool efficiency and utilization. Once the WIP bubble has been worked off, it is appropriate for the affected manufacturing operation to return to the traditional scheduling criteria. However, it may be appropriate for downstream manufacturing operations to switch to efficiency optimization based criteria to mitigate the incoming WIP bubble.

The method described herein is based on dynamic and automated adjustment of scheduling criteria depending on the state of the manufacturing system. Once a WIP bubble is detected, adjustments are automatically made to improve efficiency at the work-centers in the affected manufacturing operation. Photolithography is an important stage of manufacturing in semiconductor production, and the invention is described in the context of scheduling decisions at the photolithography area of a semiconductor fab. However, those experienced in the art will recognize that the method is easily applied to other manufacturing areas. The example in the photo-lithography area is to adjust dispatching rules to consider tool dedication for certain types of lots. The benefit of this is that lots of a particular recipe types are sent to the same tool, and thus, setup times are reduced, and lots are processed more rapidly. The present invention seeks to implement an automated adjustment to scheduling system criteria based on automatically identified events through a series of signals. Where possible, the invention seeks to predict WIP bubbles and modify the scheduling system before they have the opportunity to occur.

There are a variety of reasons why a manufacturing line may become unbalanced. For instance, the line may not be balanced from a capacity point of view, i.e., there may be an obvious bottleneck in the system that needs to be resolved via capacity investment. There are also unpredictable events which take place which can destabilize an otherwise balanced manufacturing line. It is this latter type of event that an autonomic scheduling system seeks to mitigate. These uncertain events include tool unplanned repairs, variations in repair time for a tool, high priority or rapid turn around time (RTAT) lots, development lots, changes in start patterns, batch size variation, the batch and non batch intrinsic characteristic of fabs, automated material handling system failures, reticle availability, reticle defects, etc. Adapting and responding to these issues before they result in WIP bubbles is the objective of an autonomic scheduling system.

One aspect of an autonomic scheduling method is the ability to receive a signal based on one of the above-described events, and make an automatic adjustment to the criteria used for scheduling. One form of such a system is one which monitors WIP levels at each of the manufacturing operations. If the WIP level rises above a certain dynamically defined threshold, then a signal is sent to modify the scheduling system from a fast "rules based" list dispatching rule to an optimization model that seeks to optimize throughput (defined as the volume of workload output by a work center per period of time) and relieve the WIP congestion. For balanced manufacturing systems, the use of fast dispatching rules is an efficient way to schedule the movement of lots since the focus is on frequent reprioritization (dispatch lots are regenerated each time there is an opportunity to dispatch a lot) in order to capture frequently changing information, such as which lots are available to be dispatched. As WIP levels begin to rise and the importance shifts to relieving the WIP congestion, it becomes less important to capture information in real-time and more important to develop a globally optimal schedule to take advantage of tool efficiencies.

The form of the model used to optimize the throughput at the manufacturing operations depends on specific details of the tools. For instance, some work-centers (e.g., furnace) have batching constraints which should be considered. Others have substantial sequence dependence due to high setup costs (e.g., ion implant). In all cases, however, the problem can be defined as an optimization problem with an objective function that gives a measure of the quality of a schedule base on (a) benefits associated with scheduling a given lot and (b) costs associated with the schedule (e.g., sequence dependent setup costs, material handling costs, etc.). Following is a description of a discrete optimization model for the photolithography area, in which it is necessary to coordinate the simultaneous allocation of manufacturing lots and reticles at tools.

For example, the Photolithography Bay in a 300 mm facility has photocluster tools, metrology tools, and reticle and pod stockers. At the entrance to the Bay are several WIP stockers that store pending lots waiting to be dispatched to tools in the litho bay. Tools can be broken down into groups of identical tools (e.g., Deep UV, Mid UV). Wafer lots are transported to tool load ports via an automated hoist transport system. Each tool contains storage space for up to 10 reticles (referred to as a tools library). Reticles may be swapped between the library and a stocking location. The stocking location has a pod stocker (pods are the containers for reticles) and a bare-reticle-stocker (BRS). At present, pods in the pod stocker are stored in the empty state though this practice may change in the future. To allocate a reticle to a tool, a pod is automatically transferred from the pod stocker to the BRS. A reticle is loaded in the pod and then the reticle/pod combination is transferred to the library in the tool of choice. Once a reticle is in a tool's library, it can be allocated to a wafer lot at that tool with negligible setup time.

Once a lot at a photocluster tool has been processed, it is sent to metrology tools to verify that the litho step was successful. Examples of metrology tools include overlay which ascertains that the alignment of the layer is correct, and which verifies that the critical dimension is correct. If lots are determined to have a problem, then they may be rescheduled for rework at a litho tool. Lots that are scheduled for rework typically should revisit the same tool. In general, lots revisit litho tools many times (e.g., 35 times) and it is preferred that they revisit the same tool, though this is not strictly necessary.

Due to the high cost of tools in the litho bay, this bay is typically the bottleneck for a 300 mm fab, thus, efficient scheduling of this bay will result in improved fab throughput. Reticle scheduling is a difficult problem with complex efficiency vs. throughput tradeoffs that need to be balanced. Processing a lot at a particular litho tool requires that both the lot and reticle be available at the tool. Finite availability of reticles for the litho process results in the need for advance allocation of reticles to tools. Since the tools themselves can only store a limited library of reticles, a planning system should forecast the need for reticles and assign wafer lots and reticles to tools in advance. The assignment of lots to tools should consider efficiencies associated with sequencing lots with the same recipes and similar, or escalating, temperature requirements together. The assignment of lots should also consider associated dispatch priorities.

The following mathematical model is an example that demonstrates how the invention can be used to improve the coordinated dispatching of wafer lots and reticles within this example of a litho bay. The following is one example of a scheduling optimization model implementation of the invention, and one ordinarily skilled in the art would understand that many other similar implementations are available with the invention. The following notation is used in formulating the model.

r: index for reticles 1, . . . R $r_k$: reticle required by lot k j: index for photolithography tools 1, . . . ,J n: index of wafer lots 1, . . . ,N t: index for discrete time periods 1, . . . ,T $p_{rjt}$: binary decision variable that is 1 if reticle r is assigned to photocluster tool j in period t and 0 otherwise $b_{rt}$: binary decision variable that is 1 if reticle r is assigned to stocker in period t and 0 otherwise $m^t_{rt}$: binary decision variable that is 1 if reticle r is in transit from stocker to tool j in period t and 0 otherwise $m^b_{rt}$: binary decision variable that is 1 if reticle r is in transit to stocker from tool j in period t and 0 otherwise $x_{kjt}$: binary decision variable that is 1 if lot k is assigned to tool j in period t and 0 otherwise $s_{kk'jt}$: binary decision variable that is 1 if lot k immediately precedes lot k' on tool j in period t and 0 otherwise $w_j$: number of reticles that can be held in tool j library $c^b_{kk'jt}$: cost for moving a reticle to the BRS $c^t_{kk'jt}$: cost for moving a reticle between tools $a_{kjt}$: reward for scheduling lot k on tool j in period t based on RTD information (e.g., lot priority, critical ratio)

$c^s_{kk'jt}$: penalty costs associated with job k preceding job k' on tool j in period t Objective Function: The objective function is used as a measure of the quality of the schedule and includes all the cost terms listed above.

Constraints:

1) A lot may be assigned to a tool only if the reticle is available at the tool:

$x_{kjt} <= p_{r(k),jt}$ for all k,j,t

2) A reticle may only be assigned to one tool at a time:

$\Sigma_{j=1 to J} p_{rjt} <= 1$, for all r,t

3) A lot can only be assigned to one tool at a time:

$\Sigma_{j=1 to J} \Sigma_{kjt} <= 1$, for all k,t

4) Setups and contiguity of lots:

$x_{kjt} = s_{kk'jt}$ for all k,j,t,k'

$x_{kj(t+1)} = s_{kk'jt}$, for all k,j,t,k'

5) Tool library capacity:

$\Sigma_{r=1 to N} p_{rjt} <= w_j$ for all j,t

6) Reticle conservation:

$b_{rjt} + \Sigma_{j=1 to J}(p_{rjt}) + m^b_{rt} + m^t_{rt} = 1$, for all r,t

7) Reticle Transportation:

$p_{rjt} = p_{rjt-1} + m^t_{rt}$ $b_{rjt} = b_{rjt-1} + m^b_{rt}$

The above model is a formal articulation of the value of the solution (objective function) and the underlying system constraints. All of the decision variables in the formulation are discrete and, therefore, even for small problems, finding exact solutions is unlikely. The above model formulates the problem with a mathematical objective function and a system of constraints describing the manufacturing system. The objective function depends on "reward" parameters for processing manufacturing lots, and parameters associated with sequence/setup related costs. The latter influences the building of "trains" to recognize the efficiency of scheduling multiple lots with the same recipe sequentially at the same tool. The objective function parameters can be calibrated in a continuous manner to increase or decrease the relative importance of considering lot priorities versus sequence/setup considerations. At one extreme is an objective function with setup/sequence cost coefficients set to zero and reward parameters set such that lots are guaranteed to be scheduled in the sequence prescribed by the list dispatching rules. At the other extreme, reward parameters are set to zero and the sequence/setup costs are set high. In this case, the associated lot priorities are ignored in favor of tool efficiencies. It is the adaptation of the system objective resulting from detected unbalance in the manufacturing system that represents one feature of autonomic scheduling.

One practical implementation of this invention involves a definition of system signals that can be used to forecast a pending WIP bubble to define when the scheduling model should be recalibrated. These signals fall into three categories:

1) Real-time signal indicating when the WIP in a particular stocker has exceeded a predefined critical level.

2) Real-time signal indicating occurrence of an event in which a critical element of the manufacturing line goes off-line. This may be a localized event (e.g., a particular tool requires maintenance) or a global event (the automated material handling system requires maintenance).

3) Periodic signal based on a forecasted event, in which a WIP projector is used (run periodically) to forecast the future appearance of a WIP bubble at a manufacturing operation. These forecasted WIP bubbles provide estimates of when a scheduling system objective should be adjusted so as to mitigate the WIP bubble before it appears.

In one embodiment of the invention, the autonomic scheduling system will operate in two modes, (a) existing dispatching rules and (b) optimization based method. The normal mode of operation will be mode (a) and the above signals will be used to trigger a switch to mode (b) scheduling. The duration of the switch will depend on "stopping rules" defined for each of the signal types. For type (1) signals the scheduling system will use the mode (b) method for the associated work station until the WIP level drops to a defined nominal level (e.g., 50% of the critical level).

Figure 2:
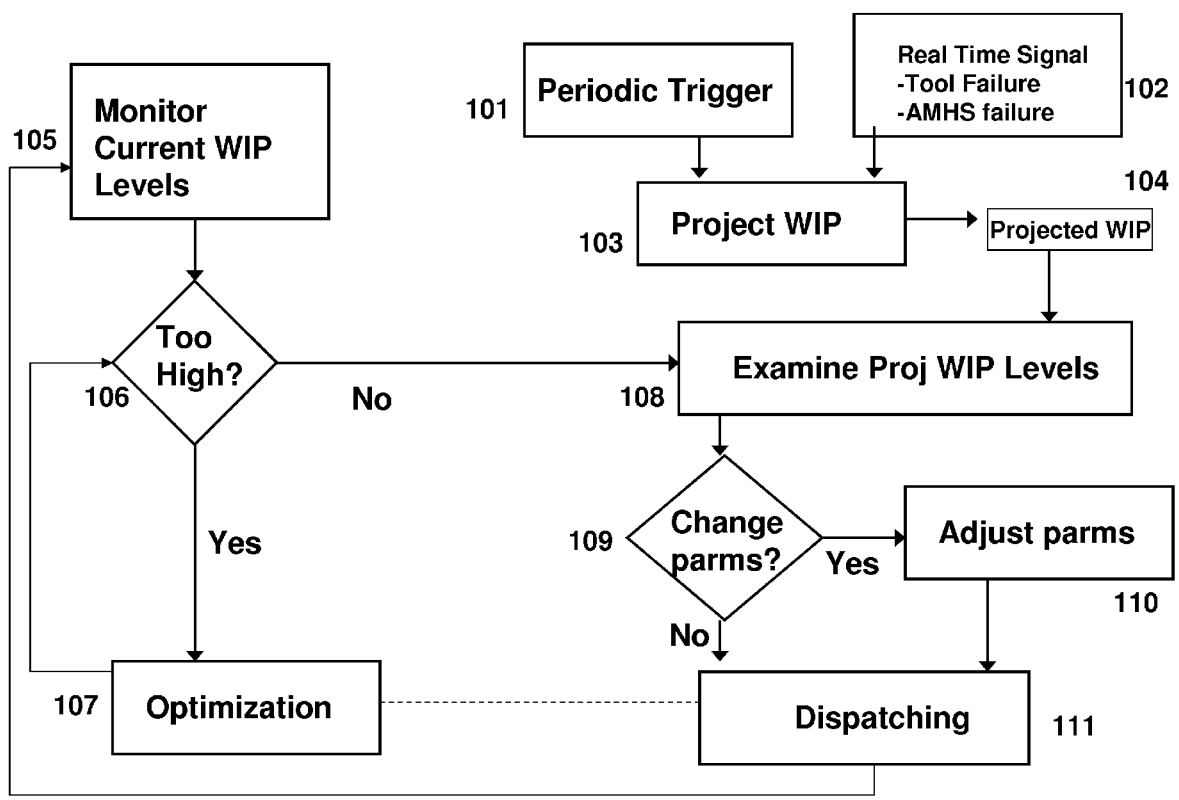
FIG. 2 is a flow diagram of processing performed with the invention.

The inventive service and method are outlined in flowchart form in FIG. 2. Block 103 projects or estimates the position of the manufacturing line's work in process (WIP) for various discrete points in time in the future. This projection is carried out via deterministic simulation using tool routing information, lot availability information, cycle time data, and other relevant data to approximate the future position of WIP in the manufacturing line. Block 103 is triggered periodically (block 101) or in reaction to a real time event which is likely to influence the WIP projection such as the failure or repair of a tool or automated material handling system (block 102). Block 103 stores its latest projection of WIP in a data base or file (block 104).

Block 105 monitors the current level of WIP awaiting processing at each of the major work centers. The level of WIP can be monitored in real time; or it may be updated less frequently. Block 106 examines whether the level of WIP at a work center is higher than a predetermined parameter. If the level of WIP presently at the work center is too high (i.e. exceeds the parameter), then control of the work center's scheduling is turned over to an optimization module (block 107) which will run periodically until it is turned off (by block 111). If block 106 determines that the WIP presently at the work center is not too high (i.e. does not exceed the parameter), then block 108 is invoked.

Block 108 reads the projected WIP from block 104 and, if it has been updated since the last invocation of block 108, then block 108 will examine those projected WIP levels. Block 109 determines whether the parameters of the dispatching method need to be changed as a result of the current and projected WIP levels. If the dispatching parameters should be adjusted, then block 110 adjusts them. Regardless of whether the dispatching parameters need updating, block 109 or 110 will lead to the invocation of block 111. Block 111 will turn off the use of the block 107 optimization and will turn on the use of the dispatching algorithm for processing WIP at that work center.

Figure 3:
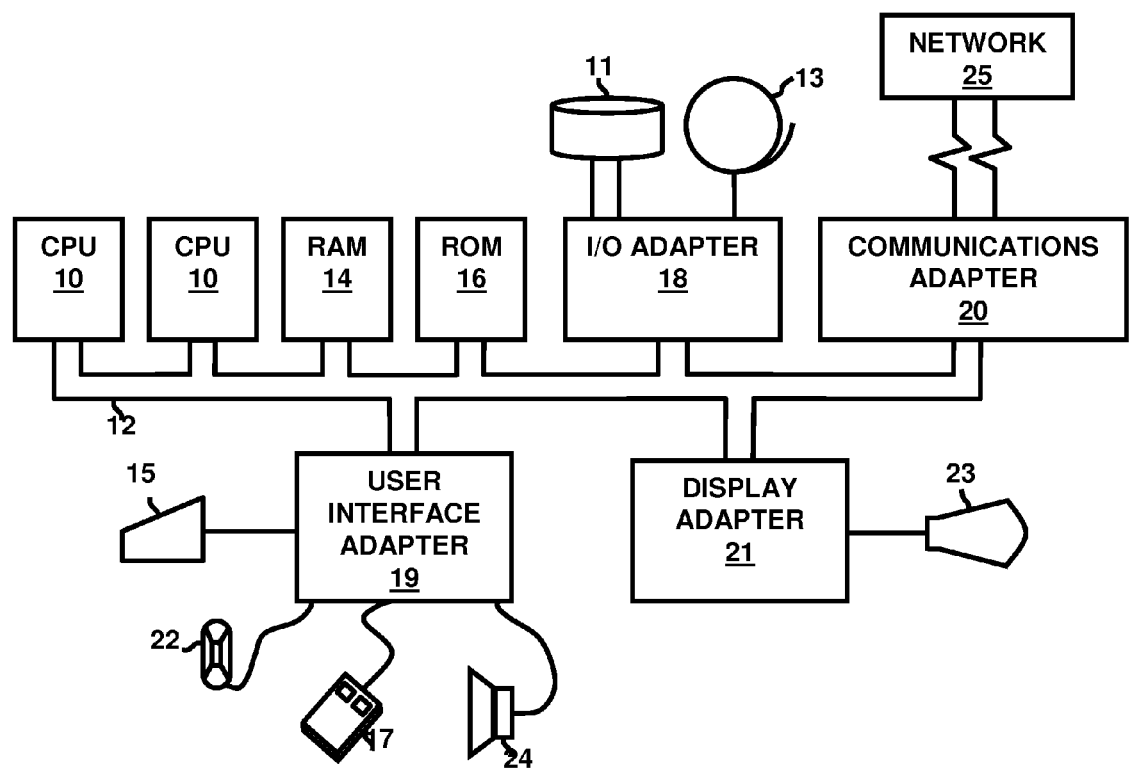
FIG. 3 is a hardware diagram illustrating an embodiment of the invention.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The steps for implementing the present invention can be programmed in any language, such as C/C++. It should be understood by those of ordinary skill in the art, however, that the represented invention is not limited to the above implementation and is independent of the computer/system architecture. Accordingly, the present invention may equally be implemented on other computing platforms, programming languages and operating systems, and also may be hard-wired into a circuit or other computational component.

Thus, as shown above, the invention automatically monitors current levels of partially completed products waiting to be processed by a tool (or group of tools), and determines whether the current levels exceed a predetermined limit. If the current levels do exceed the predetermined limit, the invention performs an optimization process. However, if the current levels do not exceed the predetermined limit, the invention performs a dispatching process. In this dispatching process, the invention automatically projects future levels of partially completed products that will be supplied to the tool to identify a future work-in-process (WIP) bubble. The WIP bubble occurs when larger than normal amounts of partially completed products are supplied to the tool. The invention automatically adjusts the operating parameters of the tool based upon both the current levels and the future levels using the automated materials handling system.

The process of projecting the future levels of partially completed products that will be supplied to the tool is based on measurements of tool usage in the manufacturing system, partially completed products availability, processing cycle time information, operational failures in the manufacturing system and AMHS that will effect the partially completed products before the partially completed products are scheduled to be supplied to the tool. If a future WIP bubble is identified, the operating parameters of the tool are adjusted to provide additional throughput for the larger than normal amounts of partially completed products. The invention can also adjust the way in which it projects in the future levels of partially completed products by comparing the projected future levels with corresponding actual supplied levels of partially completed products, and adjusting the projecting process based upon the results of such a comparison.

The invention uses multiple criteria for scheduling to manage WIP bubbles. Conventional methods achieve management of workload variation through the management of capacity availability. For instance, manufacturers may throttle production levels by periodically adding a "third shift". Also, by way of example, farmers may lease additional tools and hire additional temporary workers during the harvest season; shipping companies may hire additional workers and lease additional trucks during periods of increased sales. All of these conventional approaches are based on the management of workload variation via capacity management. To the contrary, the invention alters throughput of the tool or workgroup. Thus, the invention achieves the management of workload without varying nominal capacity. Rather, the invention leverages multiple scheduling criteria which tradeoff the benefits of (a) fast rules based dispatching and (b) formal optimization methods based on efficiency metrics. When option (b) is chosen, then, the effective throughput of the work center will increase (it will produce more), but, its nominal capacity typically expressed as number of machines—adjusted for hours per period or down time—will remain constant. Thus, instead of adding additional equipment, additional workgroups, additional employees, etc., so as to increase capacity, the invention changes the operating parameters of the tools (or workgroups), possibly at cost of tool efficiency, so as to increase throughput without adding additional tools, additional workgroups, additional employees, etc.

While the invention has been described in terms of embodiments, those skilled in the art will recognize that the invention can be practiced with modification within the spirit and scope of the appended claims. For example, the invention has been described above in the context of semiconductor manufacturing. However, the invention is applicable to many other types of manufacturing systems which involve the scheduling of material at multiple workstations (e.g., hard drive manufacturing, printed circuit board manufacturing, automobile manufacturing, etc.). Implementation of the invention results in significantly improved balancing across an extended manufacturing line which ultimately results in cost savings due to reduced WIP and inventory holding. The invention also results in the reduction of cycle time variability which relates directly to customer service metrics. In addition, the WIP does not necessarily need to refer to work items being processed in a manufacturing line. For example, the WIP could refer to customers having their needs satisfied in a multiple step service operation, such as may exist in an educational, legal, governmental, or other administrative organization.

What is claimed is:

1. A service for controlling a manufacturing system, said service comprising:
   monitoring current levels of partially completed products waiting to be processed by at least one tool;
   determining whether said current levels exceed a predetermined limit, and
   automatically adjusting scheduling criteria, depending upon whether said current levels exceed said predetermined limit, wherein said automatically adjusting of said scheduling criteria comprises:
      if said current levels exceed said predetermined limit, performing an optimization process; and
      if said current levels do not exceed said predetermined limit, performing a dispatching process;
   projecting future levels of partially completed products that will be supplied to said tool in the future; and
   adjusting operating parameters of said dispatching process based upon both said current levels and said future levels.

2. The service in claim 1, all the limitations of which are incorporated herein by reference, wherein said projecting of said future levels is based on at least one of:
   measurements of tool usage in said manufacturing system;
   partially completed products availability;
   product routing information;
   processing cycle time information; and
   operational failures in said manufacturing system that effect said partially completed products before said partially completed products are scheduled to be supplied to said tool.

3. The service in claim 1, all the limitations of which are incorporated herein by reference, wherein said projecting of said future levels predicts when larger than normal amounts of partially completed products will be supplied to said tool.

4. The service in claim 3, all the limitations of which are incorporated herein by reference, wherein said adjusting of said operating parameters is performed to provide additional throughput for said larger than normal amounts of partially completed products.

5. A program storage device readable by machine, tangibly embodying a program of instructions executable by the machine to perform a method of:
   controlling a manufacturing system, said method comprising:
      monitoring current levels of partially completed products waiting to be processed by at least one tool;
      determining whether said current levels exceed a predetermined limit; and
      automatically adjusting scheduling criteria, depending upon whether said current levels exceed said predetermined limit, wherein said automatically adjusting of said scheduling criteria comprises:
         if said current levels exceed said predetermined limit, performing an optimization process; and
         if said current levels do not exceed said predetermined limit,
      performing a dispatching process;
   projecting future levels of partially completed products that will be supplied to said tool in the future; and
   adjusting operating parameters of said dispatching process based upon both said current levels and said future levels.

6. The program storage device in claim 5, all the limitations of which are incorporated herein by reference, wherein said projecting of said future levels is based on at least one of measurements of tool usage in said manufacturing system; partially completed products availability; product routing information; and processing cycle time information.

7. The program storage device in claim 5, all the limitations of which are incorporated herein by reference, wherein said projecting of said further levels is based on operational failures in said manufacturing system that effect said partially completed products before said partially completed products are scheduled to be supplied to said tool.

8. The program storage device in claim 5, all the limitations of which are incorporated herein by reference, wherein said projecting of said future levels predicts when larger than normal amounts of partially completed products will be supplied to said tool.

9. The program storage device in claim 8, all the limitations of which are incorporated herein by reference, wherein said adjusting of said operating parameters is performed to provide additional throughput for said larger than normal amounts of partially completed products.

* * * * *

UNITED STATES PATENT AND TRADEMARK OFFICE
CERTIFICATE OF CORRECTION

PATENT NO. : 7,349,751 B2  Page 1 of 1
APPLICATION NO. : 11/538821
DATED : March 25, 2008
INVENTOR(S) : Brian T. Denton, Kenneth J. Fordyce and Robert J. Milne It is certified that error appears in the above-identified patent and that said Letters Patent is hereby corrected as shown below:

On the Title Page, Item (75)
Please add inventor Robert J. Milne

Signed and Sealed this

Second Day of December, 2008

JON W. DUDAS
*Director of the United States Patent and Trademark Office*